Feb. 2, 1932.  M. S. BLACK  1,843,199
DRILL PIPE
Filed July 11, 1927
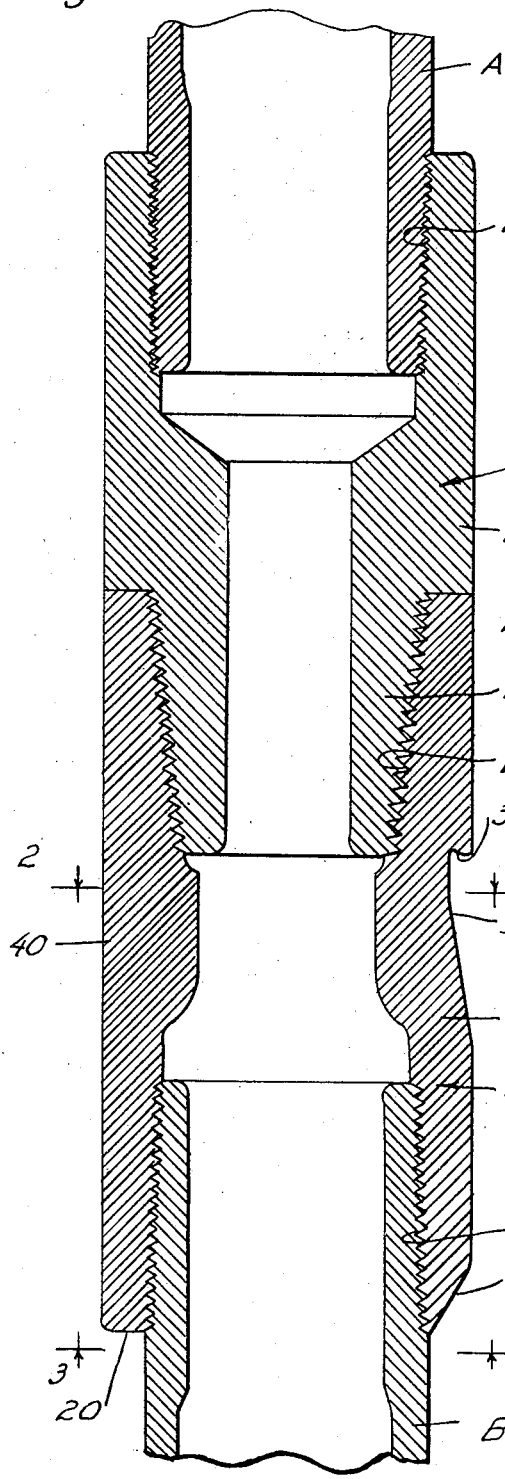
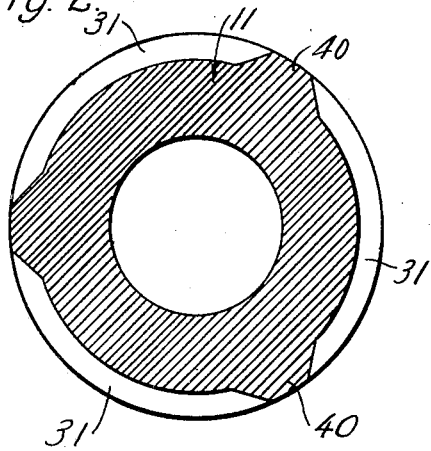
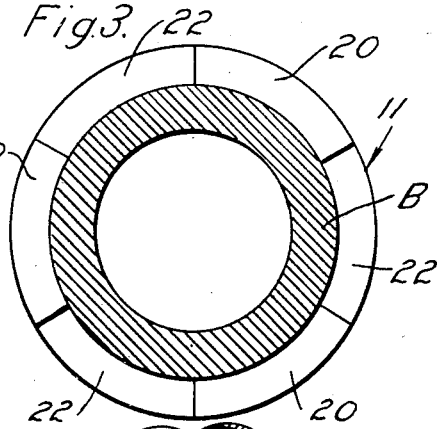
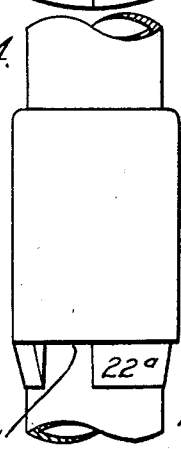
Inventor
Millard S. Black.
by
His Attorney Patented Feb. 2, 1932

1,843,199

UNITED STATES PATENT OFFICE

MILLARD S. BLACK, OF HUNTINGTON PARK, CALIFORNIA

DRILL PIPE

Application filed July 11, 1927. Serial No. 204,933.

This invention has to do with a connection for drill pipe, or the like, and it is a general object of the invention to provide a connection to cooperate with an overshot or similar fishing tool.

In the drilling of a well with the rotary method, it is common to operate the bit or drilling tool through a string of drill pipe. A string of drill pipe ordinarily includes stands of pipe formed by joining a plurality of pipe sections by plain couplings. Tool joints are provided for connecting the stands. The couplings used in forming the stands are plain or ordinary pipe couplings and are normally left connected with the pipe sections while the tool joints are comparatively heavy couplings, each formed of two sections provided with coarse threaded connections. In the course of drilling a well, the drill pipe often fails or parts, making it necessary to remove the broken off part from the well by means of a suitable fishing tool. Under ordinary circumstances drill pipe is removed or fished from a well by means of an overshot, the overshot being a tool adapted to be lowered over the broken off drill pipe and provided with a plurality of upwardly and inwardly disposed fingers adapted to engage under a projection on the drill pipe. The couplings and tool joints embodied in the drill pipe present projections or shoulders to be engaged by an overshot or like tool, it being preferred in practice to engage under a tool joint as a tool joint is heavier and presents a larger shoulder than a coupling. An ordinary overshot is constructed with spring fingers to engage the drill pipe, the fingers being mounted in the body of the overshot so that they bear inwardly on the drill pipe. This ordinary type of overshot is effective in gripping or engaging a projection on the drill pipe, however, it can not be released in the well, and therefore must be forced or broken if it is necessary to disengage the overshot from the drill pipe in the well. To overcome this characteristic disadvantage of an ordinary overshot special constructions have been incorporated in overshots whereby they can be released.

It is a primary object of this invention to provide a construction for a part projecting from a drill pipe, or the like, whereby it can be engaged and moved by an ordinary overshot and allows the overshot to be released if desired.

Another object of this invention is to provide a construction of the character mentioned, applicable to a coupling embodied in a string of pipe, for instance, to a plain pipe coupling or to a tool joint.

The various objects and features of this invention will be best understood from the following detailed description of typical forms and applications of the invention throughout which description reference is had to the accompanying drawings, in which Fig. 1 is a longitudinal detail sectional view of a portion of a string of drill pipe showing a typical tool joint embodying the present invention, Fig. 2 is a detailed transverse sectional view taken as indicated by line 2—2 on Fig. 1, Fig. 3 is a detailed transverse sectional view taken as indicated by line 3—3 on Fig. 1, and Fig. 4 is a view of a portion of a string of drill pipe showing my invention applied to a coupling.

My present invention is applicable, generally, to a projection applied to or occurring on a pipe, or the like, and is particularly applicable to a coupling or joint applied to pipe as a coupling or joint ordinarily presents parts receptive of the invention. In Figs. 1 to 3 of the drawings, I have illustrated the invention as applied to a typical or standard form of tool joint such as is commonly used in well drilling to join adjacent stands of drill pipe. I will proceed with a detailed description of this particular application of the invention, it being understood, however, that the invention is not limited to application to a tool joint or any other specific part, but is broadly applicable to any part provided on or projecting from a pipe, or the like.

In the drawings I have shown adjoining sections A and B of drill pipe connected by a tool joint which includes a pin section 10 and a box section 11. The pin section 10 of the joint includes a body 12 provided at its upper end with a screw threaded socket 13 to receive the pipe section A, and provided at its lower end with a tapered coarsely threaded projection or pin 14. The box section 11 includes a body 19 provided at its lower end with a screw threaded socket 15 to receive the end of the pipe section B, and provided in its upper end with a tapered coarsely threaded socket 16 to receive the pin 14. In practice the sections of the joint or coupling are permanently applied to the ends of the pipe sections, and when the pin 14 is seated in the socket 16, the inner ends of the joint sections are tight together as shown in Fig. 1. The bodies 12 and 19 of the two sections are of the same diameter and are considerably larger in diameter than the pipe sections A and B, so that they form a body or projection on the pipe. The lower end 20 of the body 19 is left flat to present a shoulder to receive an elevator, or the like, and in a case of an ordinary tool joint is the part engaged by the fingers of an overshot during a fishing operation.

In accordance with the broader principles of my invention, I provide parts 22 at the lower end of the body 19 operable to allow or to cause overshot fingers, or the like, to pass upwardly by the shouldered part 20 of the body. In the preferred form of the invention, the parts 22 which operate to pass or guide the overshot fingers by the shouldered part 20 are inclined to extend upwardly and outwardly from the pipe B to the outside of the body 19. For purpose of example, I will consider the construction made to suit an ordinary overshot including three spaced fingers. In this case I provide three inclined guide parts 22 at or around the lower end of the body 19, corresponding in arrangement to the fingers of the overshot. As far as my invention is concerned, the inclined parts 22 may be applied to or arranged to extend downwardly from the shoulder 20 of the body or may be formed by recessing or cutting into the end portion of the body. In the case of a tool joint, the last mentioned arrangement is preferred and is shown in Figs. 1, 2 and 3 of the drawings. I have shown the end portion of the body bevelled or cut away at three spaced points to form three inclined guide parts 22 between shoulder parts 20. With the construction thus provided by my invention, an overshot of ordinary construction, that is an overshot including spaced fingers, may be lowered downwardly over the tool joint or projection on the pipe in the ordinary manner and may be moved upwardly to engage under the shoulder parts 20 and thus operate in the usual manner. To release the overshot thus engaged it is merely necessary to rotate it until the fingers of the overshot register with or come opposite the guide parts 22, whereupon upward movement of the overshot will cause the fingers to be guided between parts 22 to pass on to the exterior of the body 19 to be passed over the body, thus releasing the pipe.

The principle or general nature of the invention is embodied in the construction above described, however, the preferred form of the invention provides shoulders 30 on or in the body above the lower end of the body to receive and hold the overshot fingers in a secure and dependable manner. The overshot fingers upon being engaged under the shoulders 20 at the lower end of the body are subject to being released upon slight rotation occurring between the overshot and the body. The shoulders 30 provided for securely holding the overshot fingers are formed by providing recesses 31 in the exterior of the body above the guide parts 22. The recesses 31 are formed or shaped so that their upper ends form the shoulders 30, it being preferred that the ends of the recesses be finished so that the shoulders 30 are inclined or pitched upwardly and inwardly as shown in Fig. 1 of the drawings. The recesses 31 are spaced apart around the body so that the body has portions 40 separating or forming divisions between the several recesses. In the preferred construction, the recesses 31 are formed in vertical alignment with the guide parts 22 so that the overshot fingers upon being guided past the lower end of the body can be moved straight up into engagement with the shoulders 30. The division parts 40 between the several recesses prevent the fingers from being disengaged from the shoulders 30 unless the overshot is deliberately rotated with sufficient force to cause the fingers to rotate over the parts 40. To disengage the overshot fingers from the shoulders 40 in a manner to release the overshot from the body, the overshot is lowered until the fingers have been lowered out of the recesses 31 and is then rotated to bring the fingers in position to move upwardly over or on the parts 40 between the recesses. The parts 40 in this case act as guides to direct or guide the fingers past the shoulders 30.

In Fig. 4 of the drawings, the invention is shown applied to a plain pipe coupling. In this case I show the parts 22a projecting from the end shoulder 20a of the coupling. The overshot fingers can be engaged under the shoulder parts 20a or can be guided past the shoulder parts by or over the guide parts 22a.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. A member for a pipe to project from the pipe and having a downwardly facing shoulder and a guide part of substantial width throughout its length and located adjacent the shoulder to guide a shoulder engaging device past the shoulder.

2. A member for a pipe to project from the pipe and having a shoulder and a guide part having substantially parallel edges and operable to guide a shoulder engaging device past the shoulder, the shoulder and guide part being at different locations around the pipe.

3. A member for a pipe to project from the pipe and having a downwardly facing shoulder and an upwardly and outwardly inclined part of substantially uniform width operable to guide a shoulder engaging device past the shoulder.

4. A coupling for a pipe to project from the pipe and having a plurality of spaced downwardly facing shoulders and inclined guide parts of substantially uniform width between the shoulders.

5. A member for connecting pipe and projecting from the pipe when in use, the member having an upwardly and outwardly inclined guide part of substantially uniform width and a downwardly facing shoulder spaced longitudinally from the guide part.

6. A coupling member for connecting pipe and projecting from the pipe when in use, the member having an upwardly and outwardly inclined guide part of substantially uniform width at its lower end and having a recess spaced from the guide part, the recess having one end forming a downwardly facing shoulder.

7. A member for connecting pipe and projecting from the pipe when in use, the member having an upwardly and outwardly inclined guide part of substantially uniform width throughout its length at one end and circumferentially spaced recesses above said end, each recess having one end forming a downwardly faced shoulder.

In witness that I claim the foregoing I have hereunto subscribed my name this 20th day of June, 1927.

MILLARD S. BLACK.